United States Patent [19]

Weavers

[11] Patent Number: 4,643,595
[45] Date of Patent: Feb. 17, 1987

[54] BALL BEARING RINGS

[75] Inventor: Brian K. Weavers, Colchester, England

[73] Assignee: RHP Group PLC, Billericay, England

[21] Appl. No.: 672,927

[22] Filed: Nov. 19, 1984

[30] Foreign Application Priority Data

Oct. 2, 1984 [GB] United Kingdom ............... 8424838

[51] Int. Cl.$^4$ ...................... F16C 33/60; B21D 53/10; B21H 1/12
[52] U.S. Cl. ............................... 384/503; 29/148.4 R; 29/148.4 C; 29/149.5 R; 384/505; 384/510; 384/513
[58] Field of Search ................. 29/148.4 C, 148.4 R, 29/149.5 R, 148.4 A, 149.5 C, 149.5 DP; 384/513, 510, 489, 505, 503

[56] References Cited

U.S. PATENT DOCUMENTS

| | | | |
|---|---|---|---|
| 2,624,105 | 1/1953 | Virtue | 29/148.4 A |
| 2,648,578 | 8/1953 | Stearns et al. | 29/148.4 A X |
| 3,127,664 | 4/1964 | Zurick | 29/149.5 B |
| 3,434,322 | 3/1969 | Cowels et al. | 29/148.4 R X |
| 3,592,519 | 7/1971 | Martin | 384/503 |
| 4,412,372 | 11/1983 | Olschewski et al. | 29/149.5 R |

*Primary Examiner*—Howard N. Goldberg
*Assistant Examiner*—Ronald S. Wallace
*Attorney, Agent, or Firm*—Russell & Tucker

[57] ABSTRACT

An outer metallic ball-bearing ring has a ball-locating raceway on its inner bore. At least one sharply defined part pyramidal notch in a land of the bore of the ring projects inwardly from one side face of the ring terminating adjacent the raceway. A full complement of balls can be assembled in the raceway by splitting the ring as is known and the notch ensures the ring fractures along a defined axial plane when exposed to controlled force.

13 Claims, 4 Drawing Figures

BALL BEARING RINGS

FIELD OF THE INVENTION

The present invention relates, in general, to ball bearings adapted to cope with high radial loading and more particularly to the outer ring of such a bearing and a method of making same.

BACKGROUND OF THE INVENTION

It is known to provide a full complement of balls in the grooved raceways of the inner and outer metallic rings of bearings by splitting and expanding the outer ring and assembling the balls between the raceways without a cage. In order to split the outer ring, it is known from U.S. Pat. No. 2,702,216 to score the outer ring on its outer periphery. From U.S. Pat. No. 3,858,288 it is known to provide a radial passage at least partly through the thickness of the ring or a score in one end face of the ring. Such measures produce a weakened or relieved zone such that when the ring is exposed to sufficient force it fractures along an axial plane defined by said zone. During fabrication, the adapted outer ring would be formed in conventional manner, hardened by heat treatment and then fractured in a jig to ensure the ring is not distorted prior to final assembly.

Problems arise in the fabrication of split bearing rings by conventional methods. Particularly, unless the ring cracks cleanly there is a danger that small loose metallic particles could be created which could become detached and enter the bearing surfaces with adverse effects. A general object of the present invention is to provide an improved bearing ring adapted to be fractured and an improved method of making such a ring.

SUMMARY OF THE INVENTION

In one aspect the present invention provides a method of making a split bearing ring which allows a full complement of balls to be assembled within a raceway in the inner bore of the ring, said method comprising making a continuous bearing ring with the raceway, providing at least one notch in the ring which extends from one side face thereof to terminate in the bore adjacent the raceway and exposing the ring to force in order to cause the ring to crack or fracture along a plane containing the notch. A pair of notches, each as aforesaid, may be provided in opposite side faces of the ring in alignment on the axial plane where separation is to occur.

The or each notch can be inclined to the axis of the ring to intersect the inner bore land but not encroach on the bearing surface defined by the grooved raceway. Since the notch is usually small it is desirable to provide a mark on the ring to identify the position of the notch. The identifiying means or mark may be a small recess or indent in a side face of the ring aligned with the notch. Alternatively, a score line in an exterior surface of the ring can be used. This score line may then supplement the notch or notches in providing a defined weakened zone whereat a separation over a clean axial plane occurs when the ring is fractured. To fracture the ring, force can be applied to compass the ring in a jig inwardly from its outer periphery. The force can be produced hydraulically or pneumatically.

A bearing ring constructed in accordance with the invention is characterised by the presence of at least one notch extending from one side face of the ring to terminate in the inner bore land thereof adjacent to the conventional raceway therein. The notch can be V-shaped and preferably tapers in depth to decrease inwardly from the side face.

The invention may be understood more readily, and various other aspects and features of the invention may become apparent from consideration of the following description.

BRIEF DESCRIPTION OF DRAWINGS

Embodiments of the invention will now be described, by way of examples only, with reference to the accompanying drawings, wherein.

DESCRIPTION OF PREFERRED EMBODIMENTS

Figure 1:
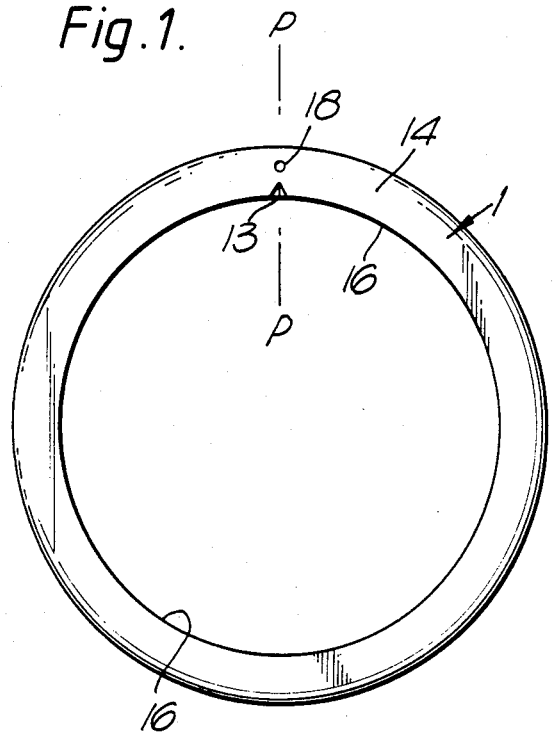
FIG. 1 is a side view of a bearing ring constructed in accordance with the invention.
Figure 2:
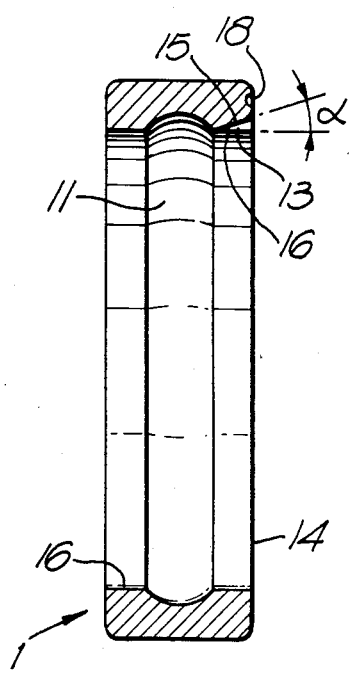
FIG. 2 is a cross-sectional view of the bearing ring shown in FIG. 1.

As shown in FIGS. 1 and 2 an integral bearing ring 1 has a raceway or track 11 of elliptical form on its inner peripheral bore 16 for contacting a plurality of balls (not shown). The ring 1 is provided with a single angled notch 13 of V-shaped profiled extending from a side face 14 of the ring 1. The inner end of the notch 13 terminates adjacent the raceway 11 but without intersecting the latter. The notch 13 also tapers in depth as shown in FIG. 2 and the radially innermost surface 15 extends at an angle $\alpha$ of approximately 30° to the land surface of the inner bore 16 of the ring 1. A small recess or indent 18 is provided in the side face 14 in registry with the notch 13 to permit the position of the latter to be more easily identified. Conveniently the notch 13 and indent 18 can be created by treating the ring 1 in a press.

Figure 3:
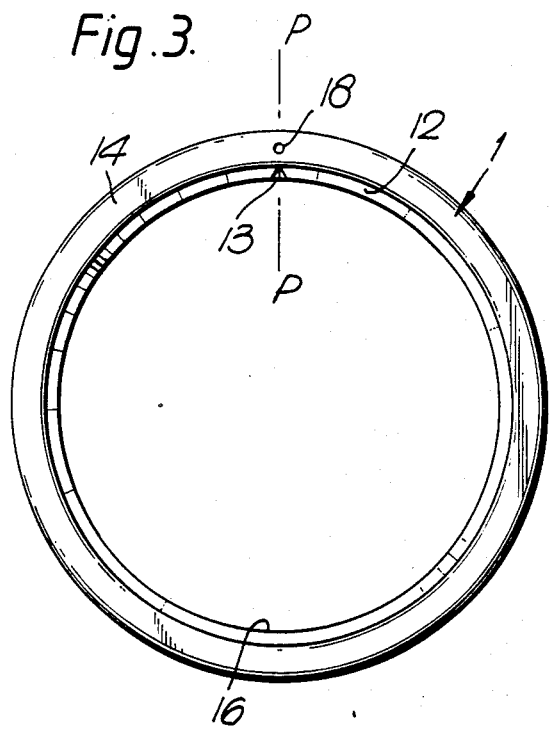
FIG. 3 is a side view of another bearing ring constructed in accordance with the invention.
Figure 4:
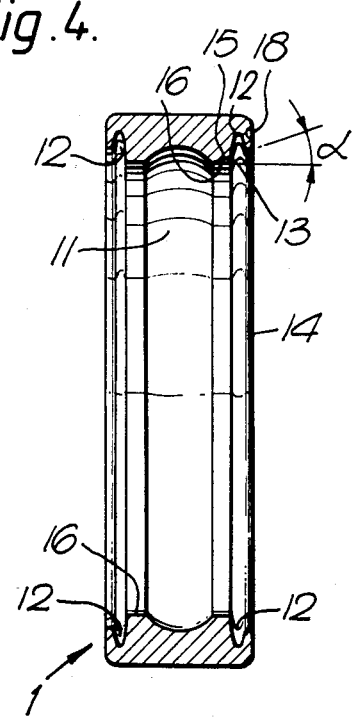
FIG. 4 is a cross-sectional view of the bearing ring shown in FIG. 3.

The ring 1 illustrated in FIGS. 3 and 4 is the same as that described and illustrated in FIGS. 1 and 2 except that the ring 1 is also provided with shaped grooves 12 open towards both side faces 14 of the ring 1. The grooves 12 serve to receive shields (not shown) as is known.

As described previously, the provision of the notch 13 permits the ring 1 to be fractured reliably along a defined axial plane. Normally the fracturing operation would be performed in a jig wherein a movable pressure plate is driven by hydraulic or pneumatic pressure and exposes the ring 1 to an inwardly directed compressive force sufficient to cause fracturing along a regular defined plane denoted P—P in FIGS. 1 and 3 containing the notch 13. It is possible to provide further relief, say a score across the outer periphery 20 of the ring 1 in alignment with the notch 13, in which case the identification recess 18 can be dispensed with. It is also possible to provide a pair of aligned notches 13 on the opposite side faces of the ring in mirror image to one another. It has been found the the notch or notches 13 enables fracturing to occur reliably with good precision without the formation of loose metal particles or pieces.

I claim:

1. An improved bearing ring of the type intended to be fractured and subsequently used in a radial rolling ball bearing of high load capacity comprising a bearing ring provided with a raceway between lands in its inner bore for location with a plurality of balls and at least one notch in the ring adapted to create a stress raiser to permit the ring to be fractured along a single axial plane containing the notch; said notch being of sharply defined part pyramidal form, aligned predominantly in an axial plane of the ring, and located in one of the lands of the bore with its base penetrating one side face of the ring and its apex disposed in said one land adjacent the raceway but not in the raceway.

2. A bearing ring according to claim 1, wherein the notch is of symmetrical triangular shape in each of three directions corresponding to side, end, and plan views thereof.

3. A bearing ring according to claim 1 further comprising means for identifying the position of the notch.

4. A bearing ring according to claim 3, wherein said identifying means comprises a score line in an exterior surface of the ring aligned with the notch.

5. A bearing ring according to claim 3, wherein the identifying means comprises a small recess or indent in a side face of the ring aligned with the notch.

6. A bearing ring according to claim 1 further comprising shield reception grooves in the bore of the ring which open into the side faces of the ring.

7. A bearing ring according to claim 1, wherein the notch tapers inwardly of the ring in each of two mutually perpendicular planes.

8. A bearing ring according to claim 1, wherein the distance between the base and the apex of the notch is substantially the same as the width of the bore land.

9. A bearing ring according to claim 1, wherein the base of the notch is substantially co-planar with said side face of the ring.

10. A bearing ring according to claim 1, wherein the base of the notch penetrates the side face of the ring over only part of the radial dimension of said side face.

11. A method of creating a split bearing ring to permit a full complement of balls to be assembled within a raceway in the inner bore of the ring to provide a radial ball bearing of high load capacity, said method comprising making a continuous bearing ring with a raceway between lands of an inner bore, forming at least one notch in one of the lands of the inner bore of the ring, said notch being of sharply defined part pyramidal form and aligned predominantly in an axial plane of the ring with its base penetrating one side face of the ring and its apex disposed in said one land of said bore of said ring adjacent the raceway but not in the raceway the notch creating a stress raiser, and exposing the ring to force in order to crack or fracture it along a single axial plane containing the notch.

12. A method according to claim 11 further comprising imparting a mark to the surface of the ring to permit the position of the notch to be identified.

13. A method according to claim 11, wherein the force to which the ring is exposed acts to compress the ring inwardly from its outer periphery.

* * * * *